Figure 3:
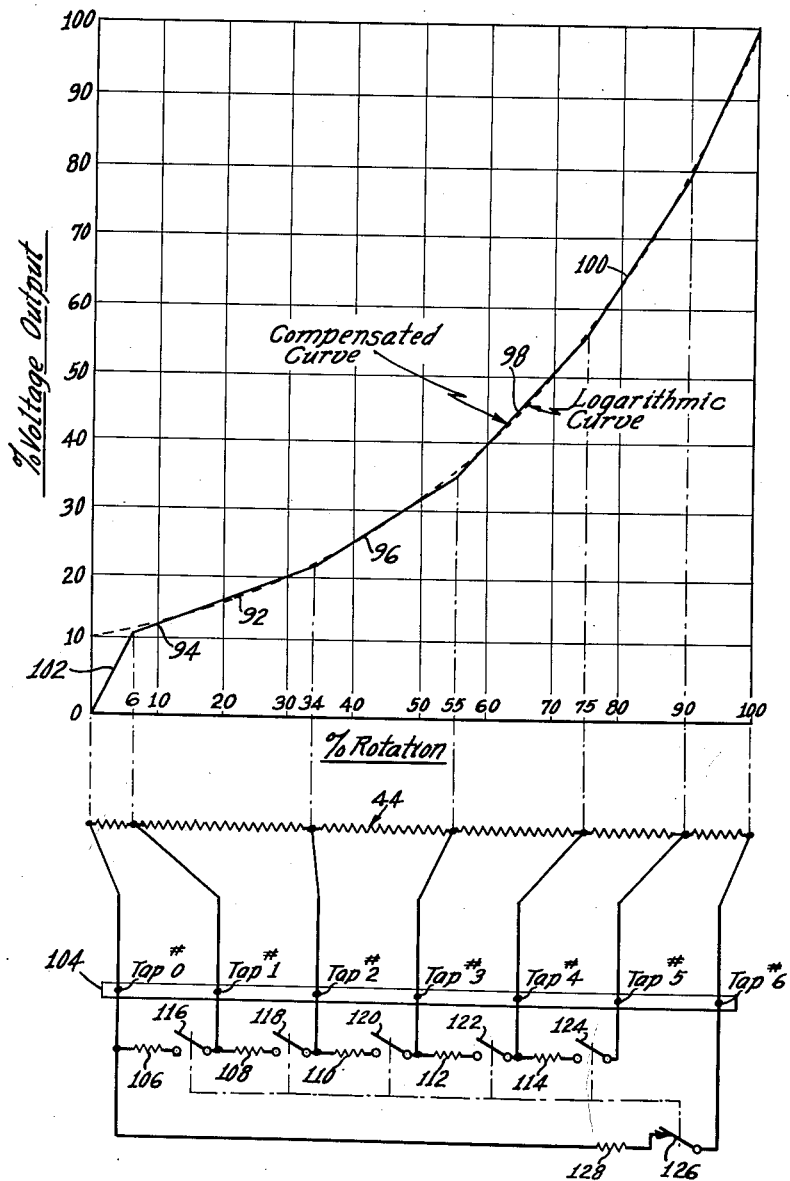

May 1, 1962     M. H. PELAVIN     3,031,917
RECORDER MEANS FOR FLUID EXAMINATION APPARATUS
Filed July 10, 1958     3 Sheets-Sheet 1
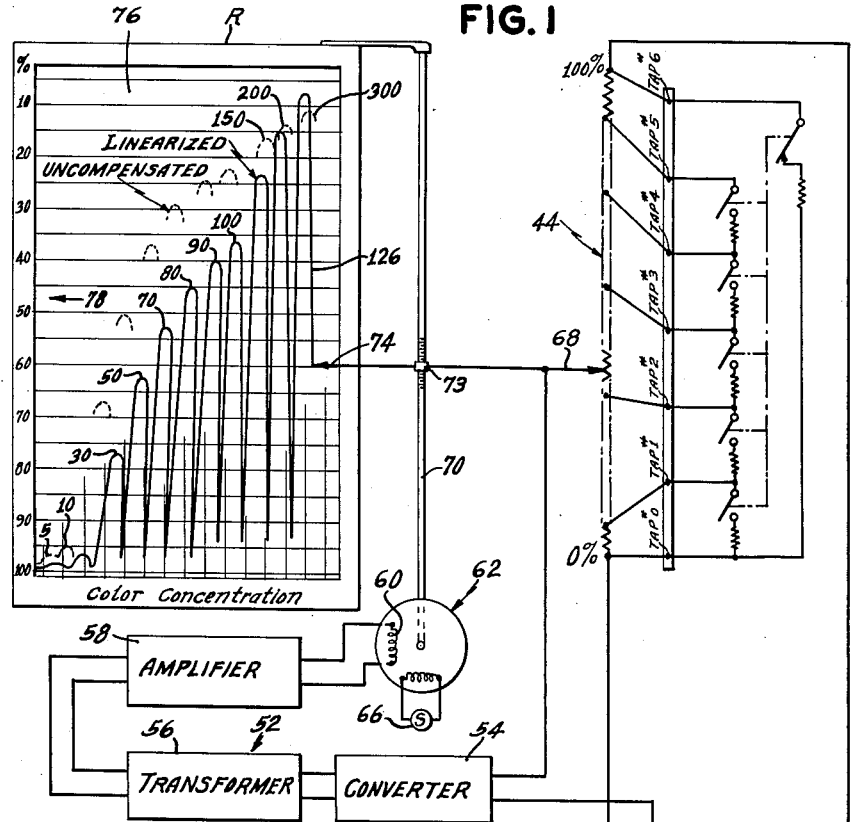
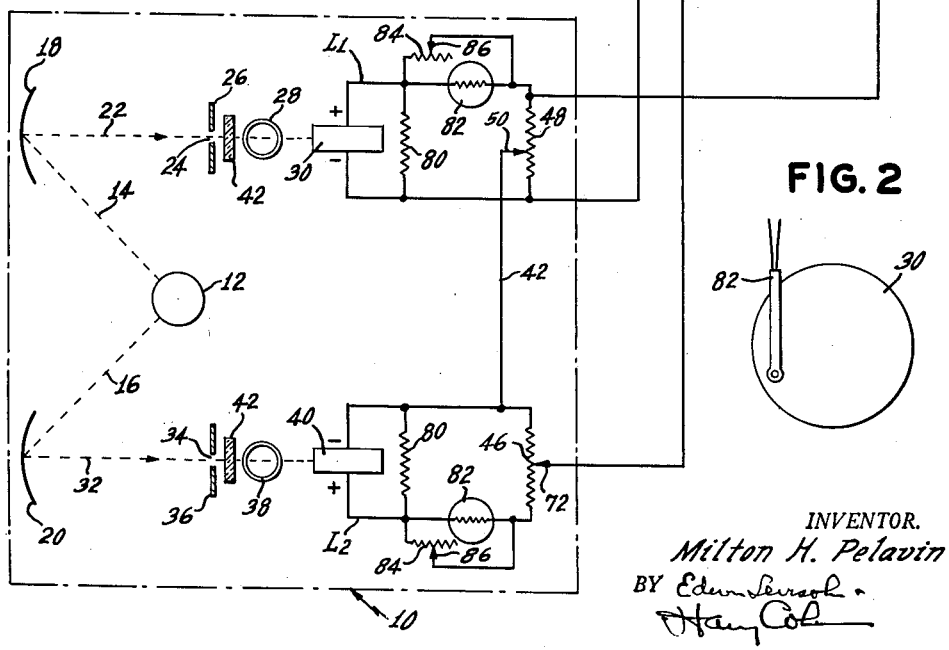
INVENTOR.
Milton H. Pelavin
BY
ATTORNEYS May 1, 1962

M. H. PELAVIN 3,031,917

RECORDER MEANS FOR FLUID EXAMINATION APPARATUS

Filed July 10, 1958

3 Sheets-Sheet 2

INVENTOR.
Milton H. Pelavin

BY

ATTORNEYS

FIG. 4
| A | B | C | D | E | F | G | H |
|---|---|---|---|---|---|---|---|
| # TAP | % ROT. | % RESIS. | SHUNTED SLIDE WIRE | | UNSHUNTED SLIDE WIRE | | VALUE OF SHUNT |
| | | | RESISTANCE VALUES | INCREMENTS | RESISTANCE VALUES | INCREMENTS | |
| 6 | 100 | 100 | 1500 | 315.0 | 3150 | 315.0 | 0 |
| 5 | 90 | 79 | 1185 | 345.0 | 2835 | 472.5 | 1278 |
| 4 | 75 | 56 | 840 | 322.5 | 2362.5 | 630.0 | 660 |
| 3 | 55 | 34.5 | 517.5 | 195.0 | 1732.5 | 661.5 | 276 |
| 2 | 34 | 21.5 | 322.5 | 157.5 | 1071 | 882 | 192 |
| 1 | 6 | 11 | 165.0 | 165.0 | 189 | 189 | 1300 |
| 0 | 0 | 0 | 0 | | 0 | | |
FIG. 5
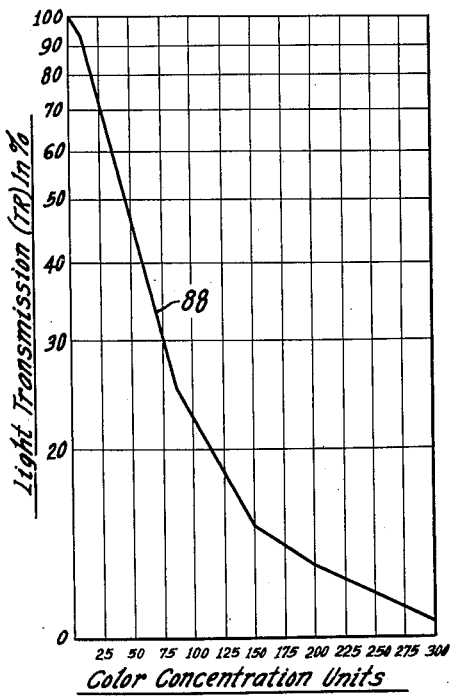
FIG. 6
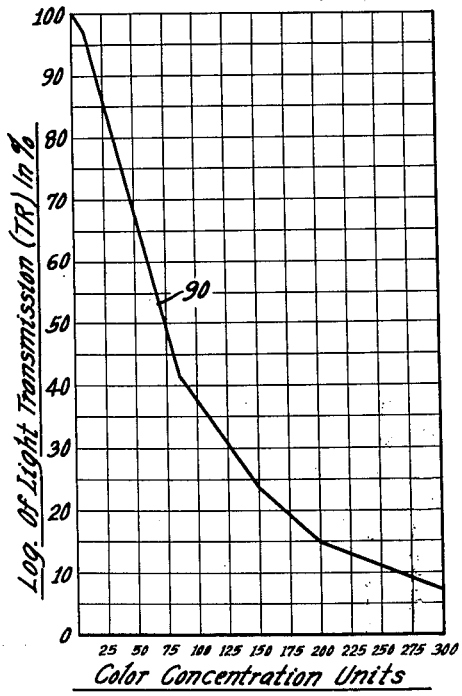
INVENTOR.
Milton H. Pelavin

United States Patent Office 3,031,917
Patented May 1, 1962

3,031,917
RECORDER MEANS FOR FLUID EXAMINATION APPARATUS
Milton H. Pelavin, Yonkers, N.Y., assignor to Technicon Instruments Corporation, Chauncey, N.Y., a corporation of New York
Filed July 10, 1958, Ser. No. 747,674
23 Claims. (Cl. 88—14)

The present invention relates, in general, to light measurements and particularly to an improved apparatus and method for determining the relative intensities of color concentrations of fluids. More particularly, the invention relates to means for providing a linear recording of measurements or values which vary in a non-linear manner and temperature compensating means therefor.

In colorimeter apparatus which employ photo-electric devices in a balancing system of the type wherein a slide wire is operated for balancing a null-type measuring circuit and wherein a recording is made of the movements of the movable arm or tap of the slide wire, equal movements of the taps produce equal increments of voltage drops or resistance, whereby the output of the slide wire potentiometer will vary linearly with movements of the tap. It is often desirable when measuring a quantity that varies in a non-linear manner to record a function of the variable quantity so that the record produced will be linearly related to the quantity being measured. This is particularly true when measuring light transmissions with a null-type measuring circuit employing linear slide wire potentiometers wherein records produced are difficult to read.

In colorimeter apparatus wherein photo-electric devices are being used to measure light transmitted through a material it is often necessary, for correct measurements, that the photo-electric devices be kept at a constant temperature, for temperature variations may affect the voltage generated by the photo-electric device. If the colorimeter is of the comparison type wherein two photo-electric devices are employed it is necessary, for correct measurement, that both devices be kept at the same temperature. This is particularly true with photo-electric devices of the silicon type, which although being substantially more sensitive to light than photo-electric devices of the selenium type, are also more susceptible to temperature changes. The use of silicon type photo-electric devices has been found necessary where colorimeter apparatus is employed to detect very small quantities of materials in a fluid medium, as for example, silica in water. High silica content in boiler feed water cannot be tolerated because of its adverse effect on boiler tubes and turbine blades. In testing for silica in water, reagents are added to the water causing a molybdenum blue reaction which will transmit light of wavelengths between 800–815 millimicrons ($m\mu$). Since selenium type photo-electric devices are only sensitive to light of wavelengths up to 625 millimicrons ($m\mu$), the use of silicon type photo-electric devices is necessary for this type of measurement.

One of the objects of the present invention is to provide a colorimetric device having means whereby a linear recording of measurements are made which vary in a non-linear manner.

Another object of the invention is to provide means whereby a normally linear slide wire device may be converted into a non-linear or logarithmic slide wire device.

A further object of the invention is to provide a recording colorimeter device having means to effect a linear recording of the transmitted light emanating from substances or materials under investigation.

A still further object of the invention is to provide a calibration curve for measurements or values which vary in a non-linear or logarithmic manner wherein the curve is linearized or expanded at compressed portions thereon.

Another object of the invention is to provide temperature compensating means whereby any variance in generated voltage output from photo-electric devices due to temperature changes will not affect measurements of light transmission.

The above and other objects, features and advantages of this invention will be fully understood from the following description considered in connection with the accompanying illustrative drawings of the presently preferred embodiment of this invention.

In the drawings:
FIG. 1 is a combined schematic and block diagram of a colorimetric recording apparatus pursuant to the present invention;
FIG. 2 is a schematic view showing the thermistor in thermal contact with a photo-electric device;
FIG. 3 is a logarithmic curve drawn according to Beer's law and utilized in computing resistance components shown in FIGURE 1;
FIG. 4 is a chart indicating a representative set of values derived with the use of the curve of FIGURE 3;
FIG. 5 illustrates a calibration curve derived from the broken line recording shown in FIGURE 1; and
FIG. 6 illustrates a calibration curve derived from the full line recording shown in FIGURE 1;

The present invention is especially useful in connection with balancing systems of the type wherein a slide wire is operated for balancing a null-type measuring circuit and wherein a recording is made of the movement of the movable arm or tap of the slide wire. Such a system comprises a colorimeter 10 of the double beam type provided with a single light source 12 from which light rays 14 and 16 are directed to laterally spaced reflectors or concave mirrors 18 and 20, respectively. From reflector 18, light is reflected, as indicated by the light beam 22, through opening 24 of a suitable light shield 26 for transmission through a suitable holder or container 28 for a standard or reference material or medium to a photo-electric device 30. The standard or reference is a colorless blank or solution. Similarly, light is reflected from the concave mirror 20, along the path indicated at 32 through an aperture 34 in a light shield 36, for transmission through a suitable container or flow cell 38 for a sample under test to the photo-electric device 40. Provision may be made, if desired, for suitable filters 42 through which the light travels before it reaches the reference or the sample. The photo-electric devices 30 and 40 are connected in circuit, in series opposition it being noted that the photo-electric device 30 feeds into a loop L1 and the photo-electric device 40 feeds into a loop L2, and that said loops are interconnected, as by wire 42, at the negative sides of the devices. The ouput of the device 30 is developed across the slide wire potentiometer 44, connected in the loop L1, and the output of the photo-electric device 40 is developed across a potentiometer 46 in the loop L2. The potentiometer 46 is a control to calibrate the recorder R for 100% light transmission through a colorless or no color concentration substance or material. Provision is made in the loop L1 for potentiometer 48 which functions as a range positioning or zero control upon movement of tap 50.

As is well known to those skilled in the art, the energization of each of the photo-electric devices 30 and 40, produced by impingement of light thereon, generates a current flow in the output loops L1 and L2 respectively. The current flow in the loop L2 produces a voltage drop across the potentiometer 46 and current flow in the loop L1 produces a voltage drop across the slide wire potentiometer 44. The voltage drops produced across said potentiometers, or portions thereof, are applied to a conventional balancing system generally indicated by the reference number 52. Said balancing system includes a converter stage 54 which is constituted preferably by a vibrating reed converter as disclosed in my prior application. The output from the converter is applied through a transformer 56 to an amplifier stage 58, as illustrated and described in detail in my prior application. The voltage difference between the taps 68 and 72 of the potentiometers 44 and 46, respectively, is applied to the converter 54. The output of the amplifier 58 is applied to one winding 60 of the two phase motor 62, the other winding 64 thereof being energized by the A.C. source 66. The motor 62 operates in response to the voltage applied at stage 54 to drive the contact arm 68 of the slide wire potentiometer 44, as indicated, by rotation of shaft 70, which drives contact arm 68 and stylus 74 by movement of member 73 along threaded shaft 70. Movement of tap 68 balances the system, at which point there is no potential difference applied to converter 54 and the motor 62 comes to rest.

Provision is made for a conventional recorder R having a recording stylus 74 coupled through member 73 to the contact arm or tap 68 driven by shaft 70 mounted to the rotor of motor 62. The stylus records the movements of the contact arm 68 on a recording strip or chart 76 driven by a suitable mechanism, not shown, in the direction of arrow 78 to provide a record on the chart of the recorder, the stylus 74 being mounted for reciprocal movement along shaft 70. The record made by the recorder is the relation between the light transmitted through the sample and the light transmitted through the standard. This relationship is known as transmission (TR) and is expressed in percent.

It will be apparent that in order to effect correct measurements photo-electric devices 30 and 40 must be subject to the same exact external conditions so that any differences in voltages generated by these photo-electric devices will be due solely to the difference between the light transmitted through the standard and the light transmitted through the sample. When employing the disclosed colorimeter measuring apparatus to detect small quantities of silica in water, wherein the wave length of the light transmitted is in the order of 800 millimicrons (800 m$\mu$) it has been found necessary to use very sensitive photo-electric devices of the silicon type rather than use a less sensitive photo-electric device such as of the selenium type. Silicon type photo-electric devices are temperature sensitive and for a given light transmission will generate a voltage that decreases approximately linearly as the temperature of the photo-electric device increases. Therefore, it will be readily apparent that any uneven heating between photo-electric device 30 and photo-electric device 40 will cause a difference of voltage to be generated between said photo-electric devices which will not be due solely to the difference of light transmission between the sample and the standard but will be due to the difference of temperature and temperature voltage characteristics between the photo-electric devices. In order to avoid any voltage differences due entirely to temperature variations between the photo-electric devices, temperature compensating means is provided in each of the loops L1 and L2 of the photo-electric devices. Since the temperature compensating devices are the same for each loop circuit only one will be described. In parallel with load resistance 48 there is placed in the circuit of loop L1 load resistance 80 and in series with load resistance 48 there is placed a thermistor 82. As is well-known to those skilled in the art a thermistor has a negative temperature coefficient so that with increased temperature the resistance of the thermistor decreases approximately in a linear manner in the range between about the voltage-temperature characteristic curve of the photo-electric device so modified, with said compensating means, decreasing generated voltage outputs from the photo-electric device due to increases of temperature will not be reflected across load resistance 48 and the voltage across load resistance 48 will remain constant. The characteristic curve of voltage vs. temperature of thermistor 82 must have a slope that is the same as the slope of the voltage-temperature characteristics curve of the photo-electric device being compensated. This may be readily obtained by placing variable shunt 84 across the thermistor. Adjustment of tap 86 of the shunt 84 will provide the proper voltage-temperature characteristic curve for a particular photo-electric device. In order for the thermistor to be subjected to the same temperature changes as the photo-electric device the thermistor should be in thermal contact with the photo-electric device. FIGURE 2 discloses diagrammatically the thermistor 82 mounted on photo-electric device 30 by any suitable means. In view of the foregoing it will be apparent that temperature compensating means have been provided whereby the output voltage of the photo-electric device loop circuit will remain constant for a given color concentration of a sample being analyzed as the generated voltage output of the photo-electric device varies with temperature changes.

According to Beer's law, the color concentration of a substance or material varies as the logarithm of the light transmitted through the substance or material. Consequently, when employing a variable potentiometer slide wire device of the linear type wherein equal movements of the slide wire tap produces equal increments of voltage, to produce balance voltages, due to the logarithmic relationship of color concentration and light transmission, a calibration curve made from a recording of various samples of known concentration tends to be bunched or squeezed at one end thereof so as to make it difficult to determine or read the concentrations of samples which fall along the bunched portion of the curve. For example, assuming that a succession of samples of known color concentrations are sent through the sample flow cell 38, which samples have color concentrations of five, ten, thirty, fifty, seventy, eighty, ninety, one hundred, one hundred and fifty, two hundred and three hundred units, respectively, there would be provided on chart 76 a recording having peaks for said various samples as indicated in broken lines, which recording is designated "Uncompensated." The percentage scale for the corresponding percentage of the light transmitted through and emanating from the various samples is indicated along the left hand margin of recording chart 76.

FIGURE 5 illustrates a calibration curve, plotted on semi-logarithmic graph paper and based upon the "Uncompensated" recording of the light transmissions (TR) in percent vs. color concentration units, as recorded on the record chart 76 of FIG. 1. It will be noted that calibration curve 88 is a non-linear or logarithmic graph which is squeezed or bunched at the upper end thereof. This makes it quite difficult to accurately determine from calibration curve 88 the color concentration of samples which record, for example, in substantially the 10% to 30% light transmission range wherein the color concentration will fall in the 76 to 300 unit range. From the graph it will be noted that small increments in percentage of light transmission produce disproportionately larger changes in color concentration units. The foregoing difficulty is obviated by the present invention pursuant to which there is provided a calibration curve 90 such as that illustrated in FIGURE 6, wherein the color curve is expanded at its high color concentration part at the upper end of chart 76. In order to obtain this highly desirable result, the previously mentioned linear slide wire potentiometer 44, in which there are equal changes in resistance or voltage for equal movements of the tap 68 therealong, is compensated or corrected to provide a non-linear or logarithmic relationship between the movement of the tap 68 therealong and the resultant resistance or voltage changes. In practice, the slide wire potentiometer 44 is of circular configuration and considering the scale of rotation of the arm or tap 68 as extending from zero to 100% rotation therealong, an equal change in the percentage of rotation along any portion of the scale will provide an equal change in the voltage available at the tap 68, as is well known to those skilled in the art. However, pursuant to the present invention, the slide wire potentiometer 44 is compensated so that percentage changes in rotation of the tap provide changes in the resistances or voltages available at tap 68 which are related in a non-linear or logarithmic fashion to the rotation of the tap. This compensation is achieved by shunting segments of the slide wire potentiometer 44 with shunts of predetermined values, as indicated generally by the reference numeral 91 (FIGURE 1) in order to provide the desired logarithmic relationship between the rotation of the tap 68 therealong and the changes in voltage output therefrom. In order to determine the amount of shunt resistances across the slide wire potentiometer 44, there is plotted on linear graph paper a logarithmic curve 92, shown as a broken line in FIGURE 3, wherein the percent voltage spread across a linear slide wire is plotted on the ordinate, and wherein the corresponding percent rotation of the tap is plotted along the abscissa of the graph. The points on the curve of FIGURE 3, are established in the following manner. In calibrating the instrument it is desired that a zero color concentration represents a 100% reading or rotation of the slide wire potentiometer. Expressing this rotation (R) decimally, $R = \log T + A$, where T is defined as transmission and is the ratio of transmitted light through a sample of fluid under analysis to the transmitted light through a fluid of zero color concentration, and where A is a proportional constant permitting the transmission or color concentration to be expressed in any arbitrary unit. According to Beer's law, wherein $\log T = KC$, C being color concentration and K being a constant, if $C=0$, then $\log T=0$, and $T=1$. Therefore, $R=0+A$ and $A=1$, or $R = \log T + 1$. A point on the dotted line curve 92, FIGURE 3, is computed in the following manner. Assume percent voltage is 60% or 0.6. Then $R = \log 0.6 + 1$, or .778 or 77.8%. The series of plotted points, when connected, all form the broken line logarithmic curve 92. A series of points is then selected along the logarithmic curve 92 which are so related that straight lines, drawn between adjacent points, will not exceed a desired minimum percentage of deviation from the true logarithmic curve 92, so as to establish the slopes between said points, which for example will not deviate by more than substantially one percent from the corresponding section of curve 92. For example, with specific reference to the curve, it will be noted that a first set of points along the percentage of rotation scale, which will provide a straight line graph therebetween with minimum deviations from the logarithmic curve 92, can be selected as 6% and 34% along the rotation scale. Similarly, a second set of points will constitute the points 34% and 55% along the rotation scale and said points are joined together by a straight line. A third set of points is selected between the 55% and the 75% points on the rotation scale, and a fourth set of points is selected at 75% and 90% along the rotation scale. The compensated or straight line segment between 6% and 34% on the rotation scale is indicated at 94, the compensated segment between points 34% and 55% is indicated at 96, the compensated segment between points 55% and 75% is indicated at 98, and the compensated segment between points 75% and 90% is indicated at 100, the segments being joined together to form a compensated logarithmic curve 102. Each of the compensated segments 94, 96, 98 and 100 establishes the required slope between its end points, the slope representing a logarithmic variation in resistance or voltage output for a degree of rotation of the potentiometer tap.

The selected points of rotation are utilized to provide taps along slide wire 44, so that tap No. 1 of the slide wire 44 as indicated on the terminal strip 104, represents a point along the slide wire reached by a six percent rotation of tap 68 from the zero resistance end of the slide wire, tap No. 2 indicates a point of 34% rotation along the slide wire 44, tap No. 3 represents a point of 55% rotation along the slide wire, tap No. 4 represents a point of 75% rotation along the slide wire, tap No. 5 represents a point of 90% rotation along the slide wire and tap No. 6 represents a point of 100% which is at the opposite end of the slide wire.

Having provided a compensated logarithmic curve with the desired slopes between each of the adjacent taps provided on the slide wire 44, the next step is to determine the proper resistance values for shunting the slide wire 44 resistance segments, between the associated taps thereof, to provide the corresponding desired slopes in accordance with the associated segments of the compensated logarithmic curve 102. The first consideration is the determination of the proper or correct load resistance which must be presented by a shunted slide wire 44 for optimum operation of the photo-electric device of the colorimeter and recorder R. For the purpose of this description, it is assumed that the recorder R will operate at optimum conditions when the total shunted resistance of the slide wire 44 is substantially 1500 ohms. As previously indicated, tap 6 represents the full voltage and consequently the full resistance of 1500 ohms. By reference to FIGURE 3, it will be noted that tap No. 5 represents 7.9 volts or 79% of the output on the vertical axis so that at tap 5 the resistance of the shunted slide wire will be $.79 \times 1500 = 1185$ ohms. Consequently, the increment from tap 5 to tap 6 is 1500 ohms minus 1185 ohms, which equals 315 ohms. The segment of the curve between tap 5 and 6 may be left unshunted because it has the steepest slope of all the segments. Considering a linear slide wire potentiometer having an increment of 315 ohms between the points of 90% rotation and 100% rotation, which correspond to the tap 5 and 6, respectively, then it will be apparent that the total resistance of such a linear slide wire is obtained by multiplying $315 \times 10$, since the segment between 90% and 100% represents 1/10 of the total resistance, to provide a total resistance for such a linear slide wire potentiometer of 3150 ohms.

Referring now to the chart illustrated in FIGURE 4, there is shown the values of the shunt resistances to be provided between the various taps of the slide wire 44 to provide the corresponding slopes between the adjacent pairs of taps. The various taps from 0 to 6 as indicated on the terminal board 104, are listed in column A. The corresponding percentage of rotation along the slide wire 44 for each tap is listed in column B. These values can be readily asserted from FIGURE 3. For example, as previously indicated tap 1 is at 6% rotation, tap 2 is at 34% rotation, etc. The corresponding percentage of resistance of the shunted or compensated slide wire, corresponding to each tap, is set forth in column C, and these values can be asserted, as will be readily apparent, from FIG. 3. For example, it will be noted that at the first tap, which corresponds to 6% rotation of the slide wire, the percentage of resistance covered by said percentage of rotation is 11%. The shunted slide wire resistance value at each tap may be readily ascertained. For example, as previously indicated, the total shunted resistance of the slide wire is 1500 ohms and this total resistance will of course be available at tap No. 6. Since tap No. 5 is at a point equivalent to 79% of the total resistance, the shunted resistance at tap No. 5 will be 79% of 1500 ohms which is 1185 ohms. In the same manner, the remaining values of the shunted resistance at each of the other taps may be asserted and their values are set forth in column D. Column E represents the increments in resistance values between adjacent taps for the shunted slide wire resistance. These values of course may be readily obtained by subtracting the resistance value at the lower numbered tap from the resistance value at the next higher numbered tap. The unshunted resistance value for the slide wire at each of the numbered taps are indicated in column F and these of course are achieved by making the same computation as for column D. The increments between the tap of the unshunted slide wire are set forth in column G and these of course may be readily computed in the same manner as the values in column E. The next and last step that remains is to determine the values of the various shunts that are required to convert the unshunted value in column G to the shunted values in column E and these may be readily obtained in a well-known manner. The results of this computation are set forth in column H which lists the values of the various shunts.

Having determined the various shunt values, resistances of appropriate value are shunted across the corresponding segments of slide wire 44. For example, as shown in FIGURE 3, and following the values set forth in column H of FIGURE 4, a resistance 106 of 1300 ohms is shunted across the taps numbered 0 and 1, a resistance 108 of 192 ohms is shunted across the taps 1 and 2, a resistance 110 of 276 ohms is shunted across the taps 2 and 3, a resistance 112 of 660 ohms is shunted across the taps 3 and 4, and a resistance 114 of 1278 ohms is shunted across the taps 4 and 5. Provision is made for the ganged switches 116, 118, 120, 122 and 124 to simultaneously cut all of the shunts into and out of the circuit.

With switches 116, 118, 120, 122 and 124 closed, the slide wire 44 is compensated by the various shunts in circuit thereacross, and with the apparatus operated in the same manner as previously described, a series of samples of known concentrations being passed through the flow cell 38, there is provided a record 126, illustrated in FIGURE 1, for samples having the same concentrations as previously described. It will be apparent that since the compensated slide wire is a non-linear or a logarithmic device, the record now indicates the measurements of the log of the light transmission (TR) expressed in percent. The various peak values obtained on the record 126 may then be plotted on linear graph paper, as illustrated in FIGURE 6, to provide a linear graph of the color concentration values vs. the percentage of the logarithm of the transmitted light to provide the linear calibration curve 90. It will be noted, by a comparison of curve 88 and 90, that the latter has been expanded at the high concentration part, whereby it becomes easier to read higher color concentration values on the linear calibration curve 90, then in the case of the logarithmic calibration curve 88. For normal operation of the apparatus wherein the slide wire 44 is uncompensated or not shunted, it is also preferable to have a total load resistance of 1500 ohms presented by the slide wire 44 for maximum or optimum operation of the recorder R. Consequently, provision is made for an additional switch 126 which is ganged with the remaining ganged switches 116 through 124. In connection with switch 126, provision is made for an additional resistor 128 which, in the illustrated condition of the switches in FIGURE 3 shunts the complete slide wire 44 to provide an overall load resistance, for example, of 1500 ohms, it being noted that in this position of the ganged switches, the various individual shunts are not in circuit with their respective segments along the slide wire 44. It will be understood when the switches 116 through 124 are closed, to throw their respective resistors in shunt with the associated segments of the slide wire 44, the switch 126 is open so that the shunt resistor 128 is out of the circuit. Consequently, in view of the fact that the total load resistance presented by the slide wire 44 when shunted singly by the resistor 128, or in the alternative by the plurality of resistors 106 through 114, remains at the same value of 1500 ohms, the resultant reading at the point representing 100% rotation of the slide wire 44 will be identical and therefore the necessity for recalibration is obviated when switching from compensated to uncompensated operation of the slide wire 44.

In view of the foregoing, it will be apparent that there is provided an apparatus having provision to selectively provide records of the light transmission (TR) expressed in percent, or alternatively, records of the log of the light transmission (TR) expressed in percent. It will also be apparent that movement of the tap of the compensated or shunted slide wire potentiometer 44 produce voltages that vary in a non-linear or logarithmic manner. With the slide wire 44 so shunted to convert the latter into a non-linear or logarithmic device, the movements of the slide wire tap represent the logarithm of the light transmission through the various samples so that the record of the light transmission is now linearly related to the concentration. The device linearly records values that vary in a non-linear manner.

This application is a continuation-in-part of my application Serial No. 664,352, filed June 7, 1957, now abandoned.

While I have shown and described the presently preferred embodiment of the invention, it will be understood that the invention may be embodied otherwise than as herein specifically illustrated or described and that in the illustrated embodiment certain changes in the details of construction and the form and arrangement of parts may be made without departing from the underlying idea of the invention. Accordingly, I do not wish to be limited to the precise construction which is shown or described herein except as may be required by the scope of the appended claims.

Having thus described my invention, what I claim and desire to secure by Letters Patent, is:

1. Colorimetric apparataus for measuring light transmission through a sample comprising, a photo-electric device having characteristics whereby the generated voltage of said device varies with changes in temperature, said device having an output circuit comprising two load resistances in parallel with each other, and temperature compensating means in series with one of said resistances for providing a constant voltage across said output circuit as the voltage generated by said photo-electric device varies with said temperature changes.

2. Colorimetric apparatus for measuring light transmission through a sample comprising, a photo-electric device having characteristics whereby the generated voltage of said device varies with changes in temperature, said device having an output circuit comprising two load resistances in parallel with each other, and temperature compensating means in series with one of said resistances for providing a constant voltage across said output circuit as the voltage generated by said photo-electric device varies with said temperature changes, said temperature compensating means comprising a thermistor and variable shunt means across said thermistor for varying the voltage-temperature characteristic of said thermistor whereby its voltage-temperature characteristic will correspond to the voltage-temperature characteristic of said photo-electric device.

3. In colorimeter apparatus whereby varying color concentrations of liquid samples under analysis are recorded, a photo-electric device having characteristics whereby the voltage output of said device varies with changes in temperature, an output circuit for said device in electrical communication therewith having two load resistances in parallel with each other, and temperature compensating means in series with one of said load resistances comprising a thermistor and variable shunt means across said thermistor for varying the voltage-temperature characteristic of said thermistor whereby its voltage-temperature characteristic will correspond to the voltage-temperature characteristic of said photo-electric device.

4. Colorimeter apparatus for measuring varying color concentrations of liquids under analysis comprising, photo-electric devices subject to a variance of temperature therebetween and wherein the photo-electric devices have characteristics whereby the generated voltage outputs of said devices vary with temperature changes, a loop circuit for each of said devices having a load resistance therein, thermistor means in each of said circuits responsive to temperature changes for providing a constant voltage across the corresponding load resistance as the voltages generated by said photo-electric devices vary with said temperature changes, and variable shunt means in each of said loop circuits for varying the voltage-temperature characteristic of the corresponding thermistor, whereby its voltage-temperature characteristic will correspond to the voltage-temperature characteristic of the corresponding photo-electric device.

5. In colorimeter apparatus whereby varying color concentrations of liquid samples under analysis are recorded by comparing the light transmission of a reference medium with the light transmission of a sample; two photoelectric devices each having characteristics whereby the generated voltage outputs of each of said photo-electric devices varies with temperature changes, a loop circuit for each of said photo-electric devices having load resistances in circuit therewith, and temperature compensating means in each of said circuits responsive to temperature changes for providing a constant voltage across the outputs of each of said loop circuits as the voltage generated by the corresponding photo-electric devices varies with said temperature changes, said temperature compensating means comprising a thermistor and variable shunt means across said thermistor for varying the voltage-temperature characteristic of said thermistor whereby its voltage-temperature characteristic will correspond with the voltage-temperature characteristic of said photo-electric device.

6. In colorimeter apparatus of the type which operates in accordance with the comparison of the light transmission of a liquid sample under analysis in respect to the concentration of a substance therein with light transmission from a reference medium and wherein the color density of the sample varies between terminal minimum and maximum values during the colorimetric examination thereof; two photo-electric devices having companion resistances across which voltage outputs responsive, respectively, to light from a reference medium and to the light from the sample are developed, said photo-electric device which is responsive to the light from the reference medium including a variable potentiometer across which the companion voltage output is developed, said variable potentiometer including a movable tap, a motor operable in accordance with the difference between said voltage outputs to adjust said movable tap of said potentiometer and thereby balance said circuit, said variable potentiometer comprising a length of wire having a plurality of resistances of predetermined values, respectively, tapped across companion successive portions, respectively, of the potentiometer for providing a non-linear voltage distribution across said potentiometer, whereby linear movement of said tap of said potentiometer by said motor balances non-linear voltages from said other photo-electric device, and a recorder provided with a stylus actuated by said motor concomitantly with the operation of said tap of said variable potentiometer for making a linear record of the light transmission of the sample liquid.

7. In colorimeter apparatus wherein varying color concentrations of liquid samples under analysis are recorded by comparing the light transmission of a reference medium with the light transmission of the sample and wherein the light transmitted varies non-linearly as the color concentration; two photo-electric devices having load resistances across which output voltages are developed responsive to light transmitted through said reference medium and said sample, respectively, variable potentiometer means in circuit with one of said photo-electric devices, said variable potentiometer means including a movable tap, a motor operable in response to the voltage difference across said load resistances to move said tap whereby said potentiometer means is adjusted and the output voltages balanced, said potentiometer means comprising segments of resistances in series with each other, predetermined shunts across said segments, respectively, to provide a non-linear voltage distribution across said potentiometer, whereby linear movement of said tap of said potentiometer means by said motor balances non-linear voltages generated by said other photo-electric device, and a recorder provided with a stylus actuated by said motor concomitantly with the operation of said tap of said variable potentiometer means for making a linear record of the light transmission of the sample liquid.

8. In colorimeter apparatus wherein varying color concentrations of liquid samples under analysis are recorded; two photo-electric devices responsive to light transmitted through a reference medium and through a sample, respectively, circuit means for measuring the difference in the output voltages of said photo-electric devices, said photo-electric device responsive to light through said reference medium having potentiometer means in circuit therewith (and having shunt resistances of predetermined value, respectively, across companion resistances, respectively, of said potentiometer means) for providing an output voltage that varies non-linearly in response to linear movement of the tap of said potentiometer means, a recorder having a stylus operable linearly under the control of said potentiometer tap, and means responsive to said output voltage difference for moving said potentiometer tap for balancing said output voltages.

9. In colorimeter apparatus wherein varying color concentrations of liquid samples under analysis are recorded; two photo-electric devices responsive to light transmitted through a reference medium and through a sample, respectively, circuit means for measuring the difference in the output voltages of said photo-electric devices, one of said photo-electric devices having potentiometer means in circuit therewith for selectively providing an output voltage that varies non-linearly in response to linear movement of the tap of said potentiometer, said potentiometer means having means for converting said non-linear voltage output to a linear voltage output in response to linear movement of said tap, said potentiometer means comprising a length of wire having a plurality of resistances of predetermined values, respectively, tapped across successive portions, respectively, of its length to provide resistance segments, said segments having predetermined shunts, respectively, in series with shunt switch means, a resistance shunt across said length of wire, and switch means operable to open said shunt switch means and throw said resistance shunt in circuit with said length of wire, whereby said potentiometer will provide voltages that vary linearly with linear movement of said tap, and a recorder having a stylus operable concomitantly with the movement of the tap of said potentiometer for making a record of the light transmission of the sample, and means responsive to said output voltage difference for moving said potentiometer tap for balancing said output voltages.

10. In colorimetric apparatus wherein color concentrations of liquid samples under analysis are recorded by comparing the light transmission of a reference medium with the light transmission of the samples, in succession, and wherein the color concentration varies logarithmically as the light transmitted; a photo-electric device for said samples, another photo-electric device for said reference medium, said photo-electric devices having load resistances across which opposed voltages are developed responsive to light transmitted through said reference medium and said samples, respectively, recorder means having potentiometer means in circuit with the photo-electric device for said reference medium, motor means operable in response to unbalanced voltages across said load resistances, respectively, for actuating the tap of the potentiometer and the stylus of the recorder simultaneously, said potentiometer means comprising segments of resistances in series with each other and predetermined resistance shunts across said segments for providing a logarithmic voltage distribution across said potentiometer, whereby linear movement of said tap by said motor balances logarithmic voltages generated by said photo-electric device for said sample and simultaneous linear movement of said stylus provides a linear record of the light transmission of said sample.

11. Colorimetric means for measuring light transmission through a sample comprising, a photo-electric device having characteristics whereby the output voltage of said device varies with changes in temperature, an output circuit for said device, temperature compensating means in said circuit responsive to temperature changes for providing a constant voltage across said output circuit as the voltage generated by said photo-electric device varies with said temperature changes, and variable resistance means in circuit with said temperature compensating means for varying the voltage-temperature characteristic of said temperature compensating means whereby its voltage-temperature characteristic will correspond to the voltage-temperature characteristic of said photo-electric device.

12. Colorimeter apparatus for comparing the light transmittance of a liquid sample under analysis as to the concentration of a substance in the liquid sample, with light transmittance of a reference medium, the color density of the sample varying between terminal minimum and maximum values during the colorimetric examination thereof, said colorimeter apparatus comprising, two photo-electric devices; resistors, electrically connected to said devices, across which voltages are developed in response to light transmitted through said reference medium and to the light transmitted through said sample under analysis; a variable potentiometer connected across said resistor which is connected to said photo-electric device which is responsive to the light transmitted through said sample under analysis; balancing means to combine the voltages developed across said resistors so as to develop a difference voltage; a motor operable in accordance with said developed difference voltage to adjust said potentiometer so as to reduce said difference voltage to a value insufficient to operate said motor; said variable potentiometer comprising a length of resistance wire and a plurality of resistors shunted across said resistance wire along the length thereof to provide a non-linear voltage distribution across said potentiometer, whereby linear movements of the tap of said potentiometer by said motor balances non-linear voltages from said photo-electric device exposed to light transmitted through said liquid sample; and a recorder having a recording stylus, actuated by said motor simultaneously with the balancing adjustment of said variable potentiometer, for making a linear record of the light transmittance of the sample liquid.

13. In colorimeter apparatus wherein varying color concentrations of liquid samples under analysis are recorded by comparing the light transmission of a reference medium with the light transmission of the sample and wherein the light transmitted varies non-linearly as the color concentration; two photo-electric devices having load resistances across which output voltages are developed responsive to light transmitted through said reference medium and said sample, respectively, variable potentiometer means in circuit with one of said photo-electric devices, said variable potentiometer means including a movable tap, a motor operable in response to the voltage difference across said load resistances to move said tap whereby said potentiometer means is adjusted and the output voltages balanced, said potentiometer means comprising segments of resistances in series with each other, predetermined shunts across said egment, respectively, to provide a non-linear voltage distribution across said potentiometer, whereby linear movement of said tap of said potentiometer means by said motor balances non-linear voltages generated by said other photo-electric device, a recorder provided with a stylus actuated by said motor concomitantly with the operation of said tap of said variable potentiometer means for making a linear record of the light transmission of the sample liquid, each of said photo-electric devices having characteristics whereby the output voltage of each device varies with changes in temperature, and temperature compensating means connected to each of said load resistances responsive to temperature changes for providing a constant voltage across each of said load resistances as the voltage generated by the corresponding photo-electric device varies with said temperature changes.

14. In colorimeter apparatus wherein varying color concentrations of liquid samples under analysis are recorded by comparing the light transmission of a reference medium with the light transmission of the sample and wherein the light transmitted varies non-linearly as the color concentration; two photo-electric devices having load resistances across which output voltages are developed responsive to light transmitted through said reference medium and said sample, respectively, variable potentiometer means in circuit with one of said photo-electric devices, said variable potentiometer means including a movable tap, a motor operable in response to the voltage difference across said load resistances to move said tap whereby said potentiometer means is adjusted and the output voltages balanced, said potentiometer means comprising segments of resistances in series with each other, predetermined shunts across said segments, respectively, to provide a non-linear voltage distribution across said potentiometer, whereby linear movement of said tap of said potentiometer means by said motor balances non-linear voltages generated by said other photo-electric device, a recorder provided with a stylus actuated by said other concomitantly with the operation of said tap of said variable potentiometer means for making a linear record of the light transmission of the sample liquid, each of said photo-electric devices having characteristics whereby the output voltage of each device varies with changes in temperature, temperature compensating means connected to each of said load resistances responsive to temperature changes for providing a constant voltage across each of said load resistances as the voltage generated by the corresponding photo-electric device varies with said temperature changes, and variable shunt means connected to each of said temperature compensating means for varying the voltage-temperature characteristic of the corresponding temperature compensating means, whereby its voltage-temperature characteristic will correspond to the voltage-temperature characteristic of the corresponding photo-electric device.

15. In apparatus for determining the quantity of a substance in a liquid; a comparison null-type balancing circuit including two photo-electric devices having companion resistances across which voltage outputs responsive, respectively, to light from a standard and to light from the substance are developed, said photo-electric device which is responsive to the light from the standard being connected to a variable potentiometer across which the companion voltage output is developed, means operable in accordance with the difference between said voltage outputs to adjust said potentiometer and thereby balance said circuit, said photo-electric devices being responsive to temperature changes which normally result in variations of said voltage outputs, and temperature compensating means for each of said photo-electric devices in thermal conducting relation with the companion device and in circuit with the companion resistance to nullify the effect of said temperature changes on said photo-electric devices and thereby prevent changes in the relations of said voltage outputs due to temperature changes.

16. Apparatus according to claim 15, further characterized in that the apparatus is a colorimeter for measuring the light transmittances through said liquid and each of the photo-electric devices is provided with a load resistance in parallel with the companion resistance and the temperature compensating means for each photo-electric device is in series with one of the associated resistances for the companion photo-electric device.

17. Apparatus according to claim 15, further characterized in that each temperature compensating means is a thermistor and each photo-electric device is of the voltage generating type and has a voltage-temperature characteristic wherein the generated voltage decreases with increases in temperature.

18. Apparatus according to claim 17, further characterized in that a variable shunt resistance is provided across the thermistor to adjust its voltage-temperature characteristic so that it will correspond to the voltage-temperature characteristic of the companion photo-electric device.

19. Colorimeter apparatus for measuring varying color concentrations of liquids under analysis, comprising photo-electric devices subject to a variance of temperature therebetween and wherein the photo-electric devices have characteristics whereby the generated voltage outputs of said devices vary with temperature changes, a loop circuit for each of said devices having a load resistance therein, temperature compensation means in each of said circuits having a resistance which varies with temperature to provide a constant voltage across the corresponding load resistance as the voltages generated by said photo-electric devices vary with said temperature changes, and variable resistance means in each of said loop circuits for varying the resistance-temperature characteristic of the corresponding temperature compensating means so that the voltage-temperature characteristic of the latter corresponds to the voltage-temperature characteristic of the corresponding photo-electric device.

20. In a colorimeter apparatus, means to obtain measurements of the light transmittances through sample liquids, said means comprising a comparison, null-type balancing circuit including two photo-electric devices having companion resistances across which voltage outputs responsive, respectively, to light from a reference medium and to light from the same are developed, said photo-electric device which is responsive to the light from the reference medium including a variable potentiometer having a movable tap and a length of resistance wire across which the companion voltage output is developed, means operable in accordance with the difference between said voltage outputs to move said tap and thereby balance said circuit, said wire having a resistance which varies linearly along the length of said wire so that the companion voltage output normally varies linearly along said length, and a series of resistance shunts connected across companion predetermined segments, respectively, of said length of wire and each having a predetermined resistance value to provide a logarithmic voltage distribution along said length of wire so that linear balancing movements of said tap correspond to logarithmic changes of the voltage along said length of wire.

21. In a colorimeter apparatus, means to obtain measurements of the light transmittances through sample liquids, said means comprising a comparison, null-type balancing circuit including two photo-electric devices having companion resistances across which voltage outputs responsive, respectively, to light from a reference medium and to light from the sample are developed, said photo-electric device which is responsive to the light from the reference medium including a variable potentiometer having a movable tap and a length of resistance wire across which the companion voltage output is developed, means operable in accordance with the difference between said voltage outputs to move said tap and thereby balance said circuit, said wire having a resistance which varies linearly along the length of said wire so that the companion voltage output normally varies linearly along said length, a series of resistance shunts connected across companion predetermined segments, respectively, of said length of wire and each having a predetermined resistance value to provide a logarithmic voltage distribution along said length of wire so that linear balancing movements of said tap correspond to logarithmic changes of the voltage along said length of wire, and switch means for connecting and disconnecting said shunts across their corresponding segments.

22. In a colorimeter apparatus, means to obtain measurements of the light transmittances through sample liquids, said means comprising a comparison, null-type balancing circuit including two photo-electric devices having companion resistances across which voltage outputs responsive, respectively, to light from a reference medium and to light from the sample are developed, said photo-electric device which is responsive to the light from the reference medium including a variable potentiometer having a movable tap and a length of resistance wire across which the companion voltage output is developed, motor means operable in accordance with the difference between said voltage outputs to move said tap and thereby balance said circuit, said wire having a resistance which varies linearly along the length of said wire so that the companion voltage output normally varies linearly along said length, a series of resistance shunts connected across companion predetermined segments, respectively, of said length of wire and each having a predetermined resistance value to provide a logarithmic voltage distribution along said length of wire so that linear balancing movements of said tap correspond to logarithmic changes of the voltage along said length of wire, and a recorder provided with a stylus actuated by said motor means concomitantly with the operation of said tap for making a linear record of the light transmission of the sample liquid.

23. In a colorimeter apparatus, means to obtain measurements of the light transmittances through sample liquids, said means comprising a comparison, null-type balancing circuit including two photo-electric devices having companion resistances across which voltage outputs responsive, respectively, to light from a reference medium and to light from the sample are developed, said photo-electric device which is responsive to the light from the reference medium including a variable potentiometer having a movable tap and a length of resistance wire across which the companion voltage output is developed, means operable in accordance with the difference between said voltage outputs to move said tap and thereby balance said circuit, said wire having a resistance which varies linearly along the length of said wire so that the companion voltage output normally varies linearly along said length, a series of resistance shunts connected across companion predetermined segments, respectively, of said length of wire and each having a predetermined resistance value to provide a logarithmic voltage distribution along said length of wire so that linear balancing movements of said tap correspond to logarithmic changes of the voltage along said length of wire, each of said resistance shunts having a switch in series therewith, a resistor connected across said length of wire, switch means in series with said resistor and operably connected to each of said switches so that upon closing said switch means said switches open and said length of wire is shunted by said resistor, whereby said potentiometer is operable to provide a linear voltage distribution along said length of wire and linear balancing movements of said tap correspond to linear changes of the voltage along said length of wire.

References Cited in the file of this patent

UNITED STATES PATENTS

| | | |
|---|---|---|
| 2,081,572 | Bagno | May 25, 1937 |
| 2,119,195 | Bagno | May 31, 1938 |
| 2,152,645 | Holven et al. | Apr. 4, 1939 |
| 2,159,181 | Ryder | May 23, 1939 |
| 2,273,356 | Holven et al. | Feb. 17, 1942 |
| 2,477,208 | Rouy | July 26, 1949 |
| 2,615,065 | Farnham | Oct. 21, 1952 |
| 2,630,735 | Rouy | Mar. 10, 1953 |
| 2,758,279 | McCarron et al. | Aug. 7, 1956 |
| 2,904,698 | Tompkins | Sept. 15, 1959 |
| 2,909,669 | Jacobs | Oct. 20, 1959 |